(12) United States Patent
Hoshi

(10) Patent No.: US 7,668,091 B2
(45) Date of Patent: Feb. 23, 2010

(54) PROGRAM, STORAGE MEDIUM, INFORMATION TRANSMISSION APPARATUS, AND INFORMATION TRANSMISSION METHOD

(75) Inventor: Tsutomu Hoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 1057 days.

(21) Appl. No.: 10/342,994

(22) Filed: Jan. 15, 2003

(65) Prior Publication Data

US 2003/0163521 A1    Aug. 28, 2003

(30) Foreign Application Priority Data

Jan. 16, 2002    (JP)    ............... 2002-007341

(51) Int. Cl.
H04L 12/26    (2006.01)

(52) U.S. Cl. ............... 370/230.1; 370/395.1

(58) Field of Classification Search ............ 370/389, 370/230, 230.1, 395, 395.1; 375/240, 240.01
See application file for complete search history.

(56) References Cited

U.S. PATENT DOCUMENTS

| | | | | |
|---|---|---|---|---|
| 3,302,176 | A * | 1/1967 | McLaughlin | ............... 710/33 |
| 6,678,250 | B1 * | 1/2004 | Grabelsky et al. | ........... 370/241 |
| 6,678,520 | B1 * | 1/2004 | Wang | ........................ 455/428 |
| 6,738,347 | B1 * | 5/2004 | Mio et al. | .................... 370/230 |
| 6,765,904 | B1 * | 7/2004 | Anandakumar et al. | ..... 370/389 |
| 7,042,843 | B2 * | 5/2006 | Ni | ............................... 370/231 |
| 7,050,455 | B2 * | 5/2006 | Nishihara | .................... 370/466 |
| 2002/0006136 | A1 * | 1/2002 | Mallory et al. | .............. 370/466 |
| 2002/0054635 | A1 * | 5/2002 | Nagai et al. | ............ 375/240.01 |
| 2002/0075802 | A1 * | 6/2002 | Sugama et al. | ........... 370/230.1 |
| 2002/0099967 | A1 * | 7/2002 | Kawaguchi | ................. 713/323 |
| 2002/0163932 | A1 * | 11/2002 | Fischer et al. | ............... 370/465 |

* cited by examiner

*Primary Examiner*—Kwang B Yao
*Assistant Examiner*—Andrew Lai
(74) *Attorney, Agent, or Firm*—Oblon, Spivak, McClelland, Maier & Neustadt, L.L.P.

(57) ABSTRACT

In transmission of data to a receiving terminal, loss of packets is prevented even when the processing capacity of the receiving terminal is low. A necessity-of-adjustment determining module determines whether a receiving terminal, specified as the destination of each transmission unit of packets received from a packetizer module, needs adjustment of transmission intervals, on the basis of a necessity-of-adjustment table which is a list of receiving terminals which need adjustment of transmission intervals. If it is determined that the receiving terminal needs adjustment of transmission intervals, the one transmission unit of packets is transferred to a transmission interval adjustment module. The transmission interval adjustment module adjusts the packet-to-packet transmission intervals for the received one transmission unit of packets and transmits the packets included in the one transmission unit of packets, packet by packet, at the adjusted transmission intervals over a network via a transmission module.

12 Claims, 8 Drawing Sheets

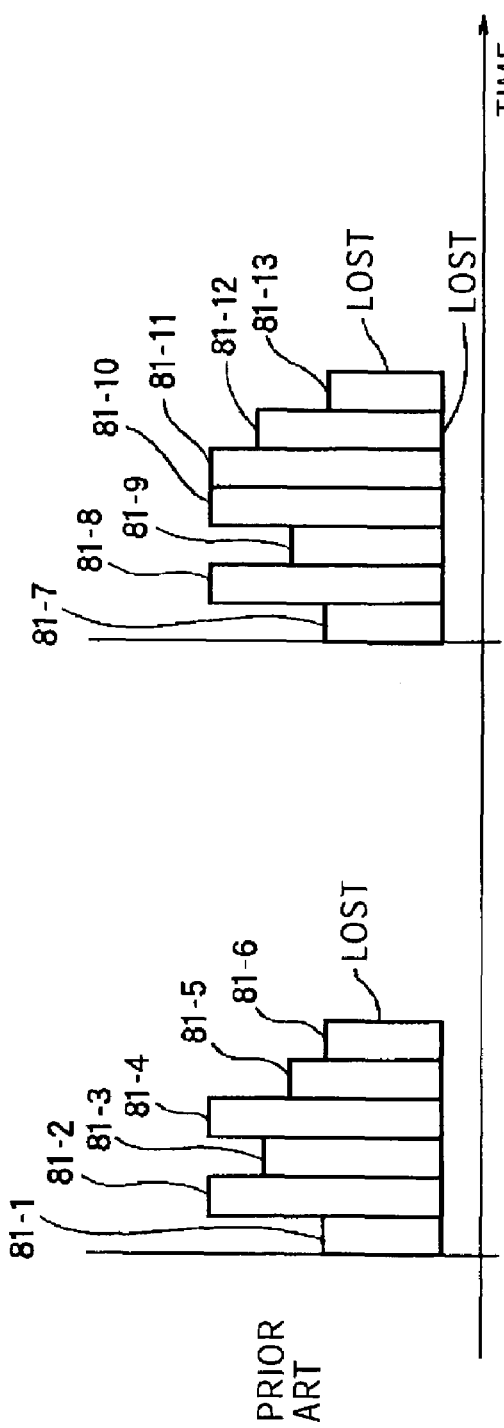
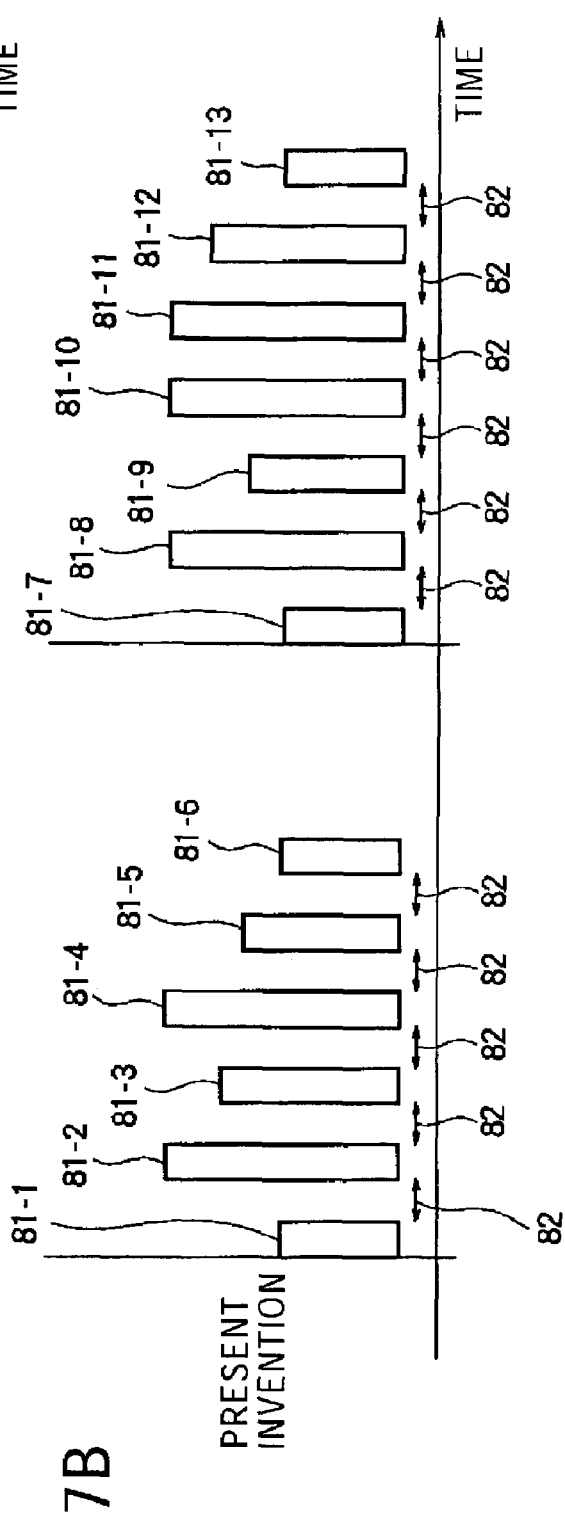
FIG. 7A PRIOR ART
FIG. 7B PRESENT INVENTION

PROGRAM, STORAGE MEDIUM, INFORMATION TRANSMISSION APPARATUS, AND INFORMATION TRANSMISSION METHOD

BACKGROUND OF THE INVENTION

1. Field of the Invention

The present invention relates to a program, a storage medium, an information transmission apparatus, and an information transmission method, and more particularly, to a program, a storage medium, an information transmission apparatus, and an information transmission method, which allow information to be transmitted in the form of packets to a receiving terminal in a highly reliable fashion without losses even when the processing capacity of the receiving terminal is low.

2. Description of the Related Art

When a conventional streaming server transmits video data including motion image data and audio data in the form of a stream to a client (receiving terminal), the video data is transmitted to the receiving terminal immediately before the video data is played back by the receiving terminal so that the required buffer capacity is minimized, or the video data is transmitted at a transmission rate so that the variation in transmission rate is minimized.

In the following description, data denoted by "video data" is not necessarily limited to video data, but "video data" may include audio data.

When the conventional streaming server continuously transmits a plurality of packets constituting video data (hereinafter, referred to as video packets) or when different types of packets such as video packets and packets constituting audio data (hereinafter, referred to as audio packets) are transmitted at the same time accidentally, there is a possibility that short-time packet congestion occurs at a receiving terminal.

If packet congestion occurs at a receiving terminal, packets output from the streaming server are transferred to the receiving terminal at the highest rate allowed by the network, even if the packets are output at a low bit rate from the streaming server.

As a result, in the case of a receiving terminal with low processing capacity, overflow can occur in an internal buffer, which can cause a packet to be lost.

Herein, "packet congestion" refers to a state in which packets are continuously transmitted (in a concentrated fashion), as shown in FIG. 1, to a receiving terminal at a rate greater than can be dealt with by the receiving terminal.

By way of example, let us consider a situation in which MPEG (Moving Picture Experts Group)-4 video data is transmitted to a receiving terminal in such a manner that one frame of data is divided into a plurality of packets and resultant packets are transmitted to the receiving terminal as shown in FIG. 1B.

More specifically, frame data 3-1 is divided into video packets 2-1 to 2-3, frame data 3-2 into video packets 2-4 to 2-5, frame data 3-3 into video packets 2-6 to 2-8, frame data 3-4 into video packets 2-9 to 2-11, and frame data 3-5 into video packets 2-12 to 2-13, and each set of resultant packets are transmitted to the receiving terminal.

In this case, packets of each packet set (for example, video packets 2-1 to 2-3 of frame data 3-1) are continuously transmitted to the receiving terminal, and thus packet congestion can occur at the receiving terminal if the processing capacity of the receiving terminal is low.

If additional audio packets 1-1 to 1-5 such as those shown in FIG. 1A are transmitted simultaneously together with respective frame data (sets of video packets) 3-1 to 3-5 shown in FIG. 1B, packets of each packet set consisting of an audio packet and video packets (for example, an audio packet 1-1 and video packets 2-1 to 2-3) are continuously transmitted to the receiving terminal, and thus a greater number of packets arrive at the receiving terminal in a short time, which results in an increase in the probability that packet congestion occurs.

If packet congestion occurs at a receiving terminal, the receiving terminal needs a higher processing capacity than is needed in a normal situation, in particular when the streaming server and the receiving terminal are connected to each other via a high-speed network. As a result, overrunning of a network buffer occurs if the processing capacity of the receiving terminal is low, and some packets are lost. That is, the receiving terminal cannot acquire some packets.

If such video data (some packets of which have been lost) is played back on the receiving terminal with low processing capacity, distortion or a partial lack occurs in the played-back video data. Lost packets may be retransmitted from the streaming server. However, retransmission results in an increase in traffic in the network.

The above-described problem becomes more serious with increasing transmission rate at which data is transmitted between a streaming server and a receiving terminal and with decreasing processing capacity of a receiving terminal (for example, mobile devices generally have low processing capacity and thus they can encounter a serious problem).

In view of the above, an object of the present invention is to prevent a packet loss which would otherwise occur at a low-capacity receiving terminal.

SUMMARY OF THE INVENTION

According to an aspect of the present invention, there is provided a program for causing a computer to perform a process comprising a transmission interval adjusting step, of adjusting packet-to-packet transmission intervals, at which a set of packets is to be transmitted to a receiving terminal, depending on the processing capacity of the receiving terminal; and a transmission step, of transmitting the set of packets, packet by packet, to the receiving terminal at the transmission intervals adjusted in the transmission interval adjusting step.

The program may further comprise a necessity-of-adjustment determining step, of determining whether the receiving terminal specified as the destination of the set of packets is a receiving terminal which needs the adjustment of transmission intervals, on the basis of information described in a receiving terminal information table including information indicating the type and the processing capacity of the receiving terminal, wherein if it is determined, in the necessity-of-adjustment determining step, that the receiving terminal specified as the destination of the set of packets is a receiving terminal which needs the adjustment of transmission intervals, execution of the transmission interval adjusting step is enabled, while if it is determined that the receiving terminal specified as the destination of the set of packets is a receiving terminal which does not need the adjustment of transmission intervals, execution of the transmission interval adjusting step is disabled.

The type described in the receiving terminal information table may be a model name.

The program may further comprise a table generation step, of generating a necessity-of-adjustment table including information identifying each receiving terminal, included in a plurality of receiving terminals, which needs the adjustment of transmission intervals, wherein the necessity-of-adjustment determining step determines whether the receiving terminal specified as the destination of the set of packets is a receiving terminal which needs the adjustment of transmission intervals, on the basis of necessity-of-adjustment table generated in the table generation step.

The necessity-of-adjustment determining step may include the steps of acquiring all packets constituting the set of packets; detecting the destination to which the packets should be transmitted; and determining whether a receiving terminal specified as the destination is a receiving terminal which needs the adjustment of transmission intervals.

The information transmission apparatus and receiving terminals are connected to each other via network, and the destination is preferably specified by an address on the network, and the information, described in the necessity-of-adjustment table to identify each receiving terminal which needs adjustment of transmission intervals, is preferably an address of the receiving terminal which needs adjustment of transmission intervals.

An FIFO technique may be used in the transmission interval adjusting step.

The transmission interval adjusting step may include the steps of sorting the packets constituting the set of packets in accordance with a particular sorting scheme; and adjusting the transmission intervals for the sorted packets, while the transmission step may transmit the packets sorted in the transmission interval adjusting step, packet by packet, at the transmission intervals adjusted in the transmission interval adjusting step.

The information may be transmitted in access units, and the set of packets may include packets constituting an access unit of video data.

The set of packets may further include packets constituting an access unit of audio data.

According to another aspect of the present invention, there is provided a storage medium including a computer-readable program stored therein for causing a computer to perform a process comprising a transmission interval adjusting step, of adjusting packet-to-packet transmission intervals, at which a set of packets is to be transmitted to a receiving terminal, depending on the processing capacity of the receiving terminal; and a transmission step, of transmitting the set of packets, packet by packet, to the receiving terminal at the transmission intervals adjusted in the transmission interval adjusting step.

According to another aspect of the present invention, there is provided an information transmission apparatus comprising: transmission interval adjusting means for adjusting packet-to-packet transmission intervals, at which a set of packets is to be transmitted to a receiving terminal, depending on the processing capacity of the receiving terminal; and transmission means for transmitting the set of packets, packet by packet, to the receiving terminal at the transmission intervals adjusted by the transmission interval adjusting means.

According to another aspect of the present invention, there is provided an information transmission method comprising a transmission interval adjusting step, of adjusting packet-to-packet transmission intervals, at which a set of packets is to be transmitted to a receiving terminal, depending on the processing capacity of the receiving terminal; and a transmission step, of transmitting the set of packets, packet by packet, to the receiving terminal at the transmission intervals adjusted in the transmission interval adjusting step.

In the program, the storage medium, the information transmission apparatus, and the information transmission method, according to the present invention, as described above, packet-to-packet transmission intervals, at which a set of packets is to be transmitted to a receiving terminal, is adjusted depending on the processing capacity of the receiving terminal, and the packets of the set of packets are transmitted packet by packet at the adjusted transmission intervals to the receiving terminal, thereby making it possible to transmit packets to the receiving terminal without causing a packet to be lost even if the receiving terminal has a low processing capacity.

BRIEF DESCRIPTION OF THE DRAWINGS

FIG. 7A is a diagram showing packets transmitted by the conventional streaming server, and FIG. 7B is a diagram showing packets transmitted by the streaming server shown in FIG. 4.

DESCRIPTION OF THE PREFERRED EMBODIMENTS

Figure 2:
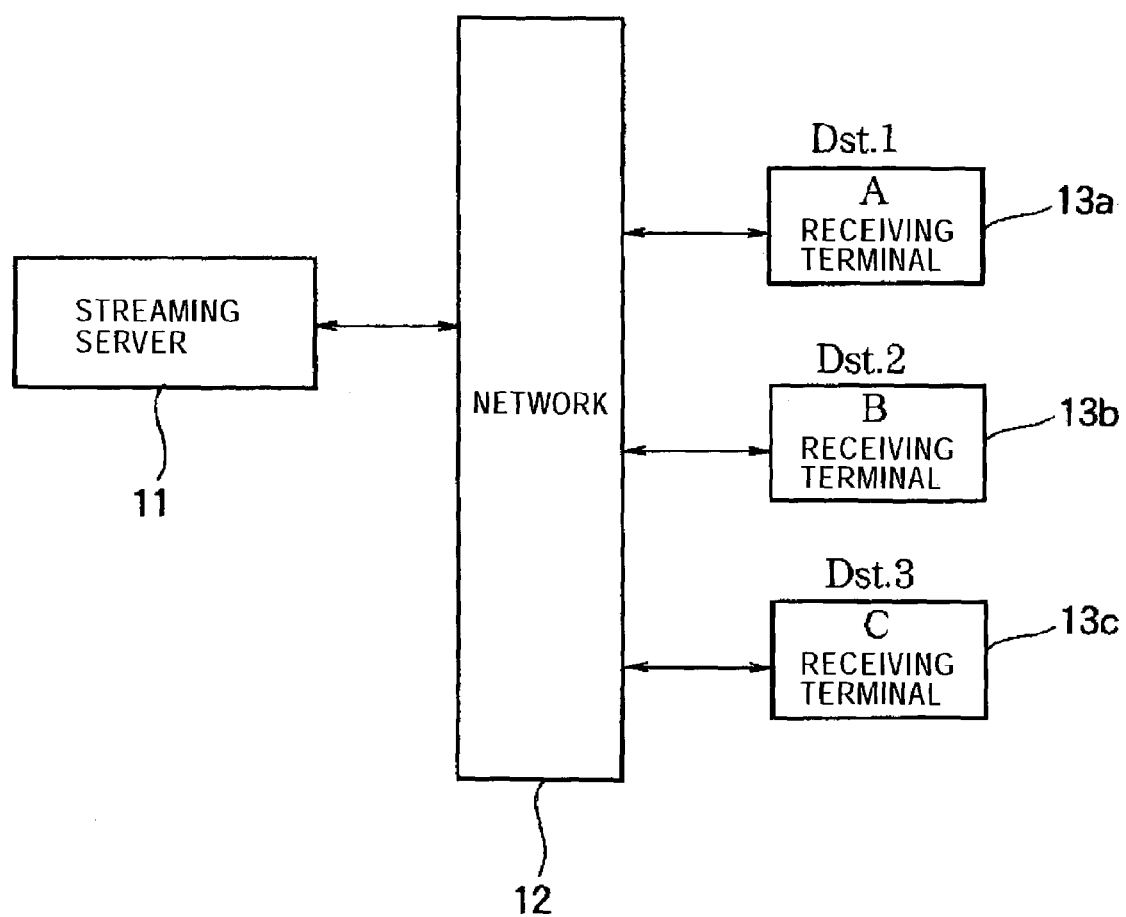
FIG. 2 is a diagram showing an example of the configuration of an information transmission system including a streaming server according to the present invention.

FIG. 2 shows an example of the configuration of an information transmission system including a streaming server 11 serving as an information transmission apparatus according to the present invention.

The streaming server 11 transmits packetized information in the form of a stream over a network in such manner that a set of packets grouped therein in accordance with a particular scheme is transmitted at a time (hereinafter, such a set of packets will be referred to as a transmission unit of packets).

In the transmission, the streaming server 11 adjusts the transmission interval between adjacent packets of one transmission unit of packets and transmits the packets included in one transmission unit of packets at adjusted transmission intervals packet by packet over the network 12.

The streaming server 11 can perform the above-described sequence of processing steps for a plurality of receiving terminals independently (concurrently). The number of receiving terminals which are concurrently dealt with by the streaming server 11 concurrently is not limited to a particular number, as long as the processing capacity of the streaming server 11 is high enough to deal with them. In this specific embodiment, it is assumed that three receiving terminals 13a to 13c, which will be described later, are dealt with by the streaming server 11.

That is, in the present embodiment, the streaming server 11 adjusts the transmission intervals for the respective receiving terminals 13a to 13c depending on their processing capacity, and the streaming server 11 transmits packets, in each transmission unit of packets, to the respective receiving terminals, packet by packet at the transmission intervals adjusted for the respective receiving terminals.

Although there is no particular limitation on the type of information (packetized information) transmitted, it is assumed herein that video data (image data and audio data) encoded according to the MPEG-4 algorithm is transmitted.

There is also no particular limitation on the type of a set of packets transmitted as one transmission unit. In a case in which information transmitted is MPEG-4 video data, a preferable example is a set of video packets constituting one frame data (for example, video packets 2-1 to 2-3 constituting frame data 3-1 shown in FIG. 1B) or a set of an audio packet and video packets (for example, a set of an audio packet 1-1 and video packets 2-1 to 2-3 shown in FIG. 1C).

The unit of data processed by the information communication system (the streaming server 11 and the receiving terminals 13a to 13c) shown in FIG. 2 is not limited to one frame (as employed in the present embodiment), but one field or the like may be employed as the unit of data. In the present invention, the unit of data is also referred to as an access unit.

The network 12 transfers one transmission unit of packets transmitted from the streaming server 11 to a specified destination.

In the present embodiment, it is assumed that the destination is specified by an address defined on the network 12. More specifically, a transmission unit of packets transmitted over the network 12 is supplied to the receiving terminal 13a when Dst.1 is specified as the destination address, to the receiving terminal 13b when Dst.2 is specified as the destination address, and to the receiving terminal 13c when Dst.3 is specified as the destination address.

There is also no limitation on the type of the network 12. In the present embodiment, the network 12 is assumed to be an Ethernet (registered trademark) network.

Each of the receiving terminals 13a to 13c sequentially decodes and reproduces packets in transmission unit received via the network 12.

Now, referring to some figures, an example of the configuration of the streaming server 11 is described.

Figure 3:
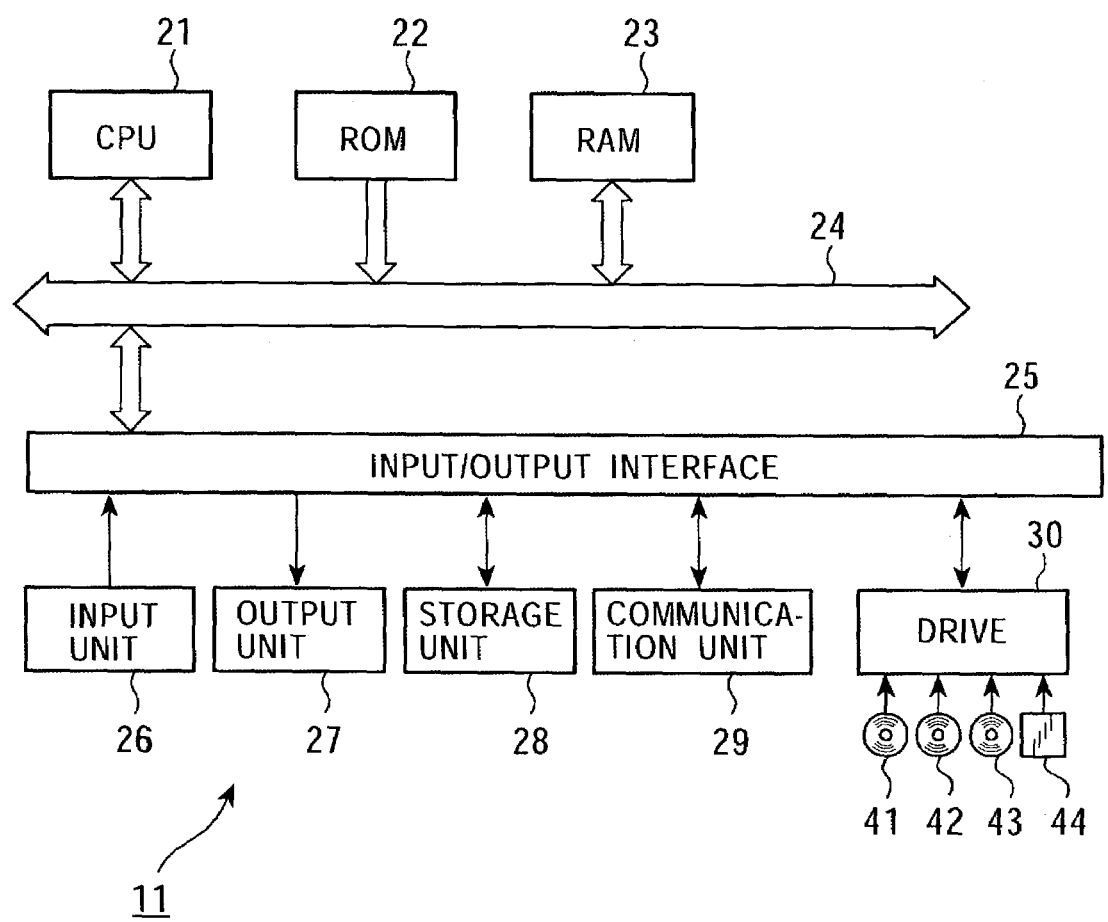
FIG. 3 is a block diagram showing an example of hardware configuration of the streaming server shown in FIG. 2.

FIG. 3 is a block diagram showing an example of hardware configuration of the streaming server 11.

A CPU (Central Processing Unit) 21 performs various kinds of processing in accordance with programs stored in a ROM (Read Only Memory) 22 or programs loaded in a RAM (Random Access Memory) 23 from a storage unit 28.

The RAM 23 is also used to store data used by the CPU 21 in various processes.

The CPU 21, the ROM 22, and the RAM 23 are connected to each other via a bus 24. The bus 24 is also connected to an input/output interface 25.

The input/output interface 25 is connected to an input unit 26 including a keyboard and a mouse, an output unit 27 including a display, and storage unit 28 including a hard disk, and a communication unit 29 including a modem or a terminal adaptor. The communication unit 29 performs processing associated with communication via a network (the network 12 in the example shown in FIG. 1).

The input/output interface 25 is also connected to a drive 30, as required. A storage medium such as a magnetic disk 41, an optical disk 42, a magnetooptical disk 43, or a semiconductor memory 44 is mounted on the drive 30, as required, and a computer program is read from the storage medium and installed into the storage unit 28.

Figure 4:
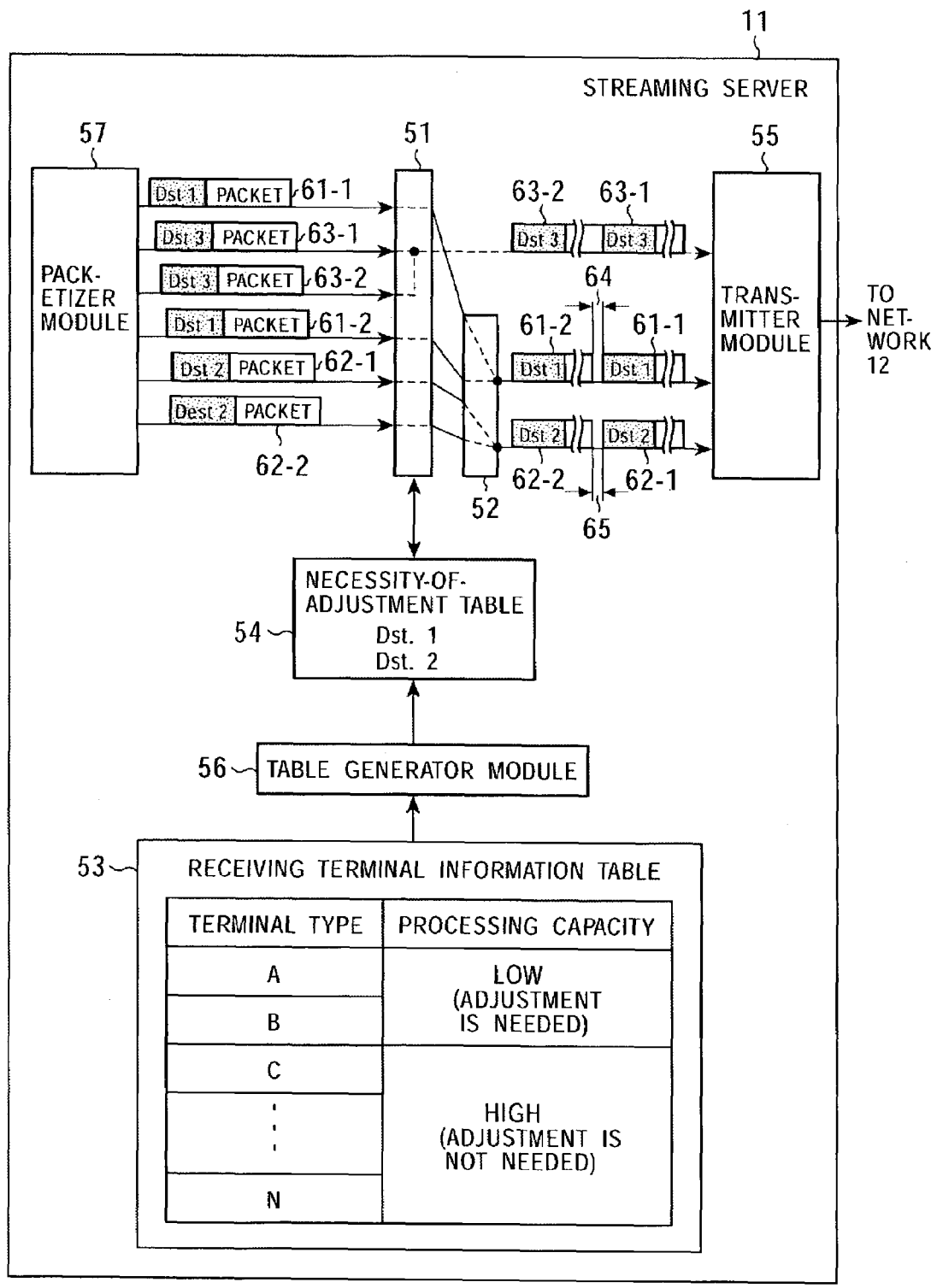
FIG. 4 is a block diagram showing an example of software configuration of the streaming server shown in FIG. 2.

FIG. 4 is shows an example of a software program installed on the streaming server 11. This software program includes a plurality of modules. Each module has its own algorithm and operates according to the algorithm. The CPU 21 reads necessary modules and executes them.

The packetizer module 57 converts MPEG-4 video data into packets of a form acceptable by a receiving terminal (one of receiving terminals 13a to 13c shown in FIG. 1) specified by the destination, and the packetizer module 57 supplies the resultant packets to a necessity-of-adjustment determining module 51.

That is, the packetizer module 57 generates packets to be transmitted to respective receiving terminals specified as destinations and supplies the generated packets to the necessity-of-adjustment determining module 51.

In this specific example, packets 61-1 and 61-2 are generated as those to be transmitted to the receiving terminal 13a, packets 62-1 and 62-2 are generated as those to be transmitted to the receiving terminal 13b, and packets 63-1 and 63-2 are generated as those to be transmitted to the receiving terminal 13c.

In the present embodiment, the streaming server 11 operates in accordance with the RTSP (Real-Time Streaming Protocol), and the destination of each packet is identified by an address of a receiving terminal which has issued an RTSP connection request, although there is no particular limitation on the manner of identifying the destination of each packet.

If the necessity-of-adjustment determining module 51 receives one transmission unit of packets from the packetizer module 57, the necessity-of-adjustment determining module 51 checks a necessity-of-adjustment table 54 to determine whether a receiving terminal specified as the destination of that one transmission unit of packets needs adjustment of transmission intervals between packets of the one transmission unit of packets (hereinafter, such a receiving terminal will be referred to as a receiving terminal which needs adjustment).

In practice, a set of packets constituting one frame of data or the like is preferably employed as one transmission unit of packets, as described earlier. However, in the present example, for simplicity, a set of packets 61-1 and 61-2, a set of packets 62-1 and 62-2, and a set of packets 63-1 and 63-2 are employed as transmission units of packets.

If the necessity-of-adjustment determining module 51 determines that the receiving terminal specified as the destination of the supplied one transmission unit of packets does not need adjustment, the necessity-of-adjustment determining module 51 supplies the one transmission unit of packets to a transmitter module 55. However, if the determination indicates that that the receiving terminal specified as the destination of the supplied one transmission unit of packets needs adjustment, the necessity-of-adjustment determining module 51 supplies the one transmission unit of packets to the transmission interval adjustment module 52.

In other words, if it is determined that the receiving terminal specified as the destination of the supplied one transmission unit of packets does not need adjustment, the necessity-of-adjustment determining module 51 disables the transmission interval adjustment module 52, while if it is determined that the receiving terminal specified as the destination of the supplied one transmission unit of packets does not needs adjustment, the necessity-of-adjustment determining module 51 enables the transmission interval adjustment module 52.

Herein we assume that the receiving terminals 13a and 13b are registered as receiving terminals which need adjustment in the necessity-of-adjustment table 54. In practice, as described later, the address of each receiving terminal which needs adjustment is also described in the necessity-of-adjustment table 54.

Thus, if the necessity-of-adjustment determining module 51 receives one transmission unit of packets (set of packets

61-1 and 61-2) to be transmitted to address Dst.1 (the receiving terminal 13a) or one transmission unit of packets (set of packets 62-1 and 62-1) to be transmitted to address Dst.2 (the receiving terminal 13b), the necessity-of-adjustment determining module 51 determines that the receiving terminal specified as the destination needs adjustment, and thus the necessity-of-adjustment determining module 51 supplies the one transmission unit of packets to the transmission interval adjustment module 52.

On the other hand, in a case in which address Dst.3 (the receiving terminal 13c) is specified as the destination of the one transmission unit of packets (set of packets 63-1 and 63-2) supplied to the necessity-of-adjustment determining module 51, the necessity-of-adjustment determining module 51 determines that the receiving terminal specified as the destination does not need adjustment, and thus the necessity-of-adjustment determining module 51 supplies the one transmission unit of packets to the transmitter module 55. In this case, the packets 63-1 and 63-2 are continuously supplied (without a transmission interval) to the transmitter module 55.

The transmission interval adjustment module 52 adjusts the transmission interval between packets of the one transmission unit of packets supplied from the necessity-of-adjustment determining module 51 and sequentially supplies the packets of the one transmission unit of packets at the adjusted transmission intervals to the transmitter module 55.

For example, if the transmission interval adjustment module 52 receives the set of packets 61-1 and 61-2, the transmission interval adjustment module 52 determines the transmission intervals 64 between the packets 61-1 and 61-2. Thereafter, the transmission interval adjustment module 52 first supplies the packet 61-1 to the transmitter module 55, and then supplies the packet 61-2 to the transmitter module 55 when a time equal to the transmission interval 64 has elapsed.

Similarly, if the transmission interval adjustment module 52 receives the set of packets 62-1 and 62-2, the transmission interval adjustment module 52 determines the transmission intervals 65 between the packets 62-1 and 62-2. Thereafter, the transmission interval adjustment module 52 first supplies the packet 62-1 to the transmitter module 55, and then supplies the packet 62-2 to the transmitter module 55 when a time equal to the transmission interval 65 has elapsed.

Any method may be employed to determine the transmission interval between packets. For example, the transmission interval adjustment module 52 may perform adjustment for each of the transmission intervals between adjacent packets. In the present embodiment, the transmission interval adjustment module 52 adjusts the transmission intervals such that all packet-to-packet transmission intervals become equal for a given set of packets.

For example, when the average packet size of given one transmission unit of packets is 8 kbits, if the transmission intervals are equally set (adjusted) to 10 msec, the packets are transmitted at a maximum rate of 800 kbps.

Figure 5:
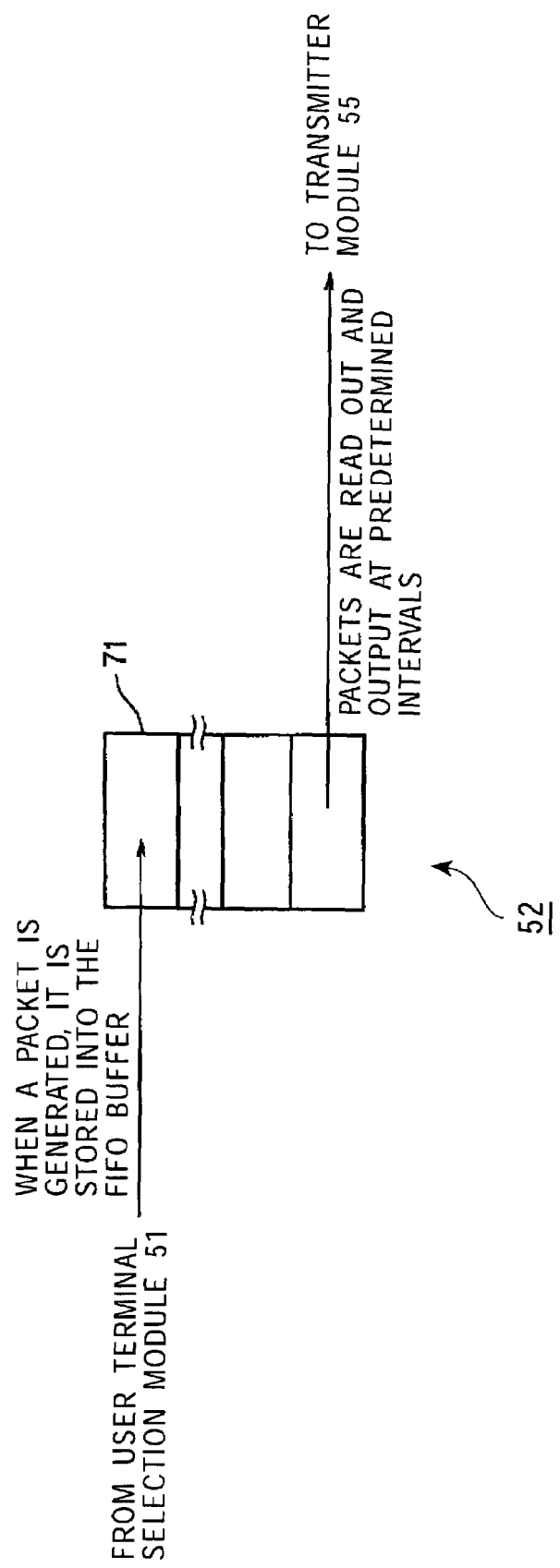
FIG. 5 is a diagram showing an example of a FIFO buffer used by a transmission interval adjustment module 52 shown in FIG. 4.

More specifically, in the present embodiment, the transmission interval adjustment module 52 adjusts the transmission intervals by means of the FIFO technique using a FIFO (First-In First-Out) buffer 71 such as that shown in FIG. 5 so that all transmission intervals become equal.

That is, if the transmission interval adjustment module 52 receives packets from the necessity-of-adjustment determining module 51, the transmission interval adjustment module 52 stores the received packets into the FIFO buffer 71 and then takes the packets, one by one, out of the FIFO buffer 71 at the determined intervals and supplies them to the transmitter module 55 one by one.

The intervals (transmission intervals) at which the packets are taken out of the FIFO buffer 71 are set to an equal value (period of time) taking into account the processing capacity of hardware and software of the processing capacity.

Referring again to FIG. 4, the transmitter module 55 transmits the packets received from the necessity-of-adjustment determining module 51 or the transmission interval adjustment module 52 over the network 12.

More specifically, for example, the transmitter module 55 first transmits the packet 61-1 received from the transmission interval adjustment module 52 over the network 12, and then, when a period of time equal to the transmission interval 64 has elapsed, the transmitter module 55 transmits the packet 61-2 received from the transmission interval adjustment module 52 over the network 12.

Similarly, the transmitter module 55 transmits the packet 62-1 received from the transmission interval adjustment module 52 over the network 12, and then, when a period of time equal to the transmission interval 65 has elapsed, the transmission module 55 transmits the packet 62-2 received from the transmission interval adjustment module 52 over the network 12.

On the other hand, the packets 63-1 and 63-2, continuously supplied from the necessity-of-adjustment determining module 51 to the transmitter module 55, are continuously transmitted from the transmitter module 55 over the network 12.

Note that the transmitter module 55 is not necessarily needed. For example, the function of the transmitter module 55 may be incorporated into the necessity-of-adjustment determining module 51 and the transmission interval adjustment module 52. In this case, the necessity-of-adjustment determining module 51 and the transmission interval adjustment module 52 can directly transmit packets over the network 12.

A table generator module 56 generates a necessity-of-adjustment table 54, which also includes data indicating addresses of receiving terminals which need adjustment, on the basis of the receiving terminal information table 53.

More specifically, if one of the receiving terminals 13a to 13c is connected to the streaming server 11 (that is, if the streaming server 11 is accessed by one of the receiving terminals 13a to 13c via the network 12), the table generator module 56 checks the receiving terminal information table 53 to detect the type of that receiving terminal and further determine whether the processing capacity of the receiving terminal (the detected type of receiving terminals) is so low that adjustment is needed. If it is determined that the processing capacity of the receiving terminal is so low that adjustment is needed, the table generator module 56 determines that the receiving terminal is one of receiving terminals which need adjustment and the table generator module 56 describes (registers) the address of that receiving terminal in the necessity-of-adjustment table 54.

The receiving terminal information table 53 is stored in advance in, for example, the storage unit 28 shown in FIG. 3, and the necessity-of-adjustment table 54 is stored in, for example, the RAM 23.

There is no particular limitation on the types described in the receiving terminal information table 53, as along as the description of the types allows the table generator module 56 to classify (identify) a receiving terminal connected to the streaming server 11. There is no particular limitation on the processing capacity described in the receiving terminal information table 53, as along as the description of the processing capacity allows the table generator module 56 to determine whether a receiving terminal connected to the streaming server 11 needs adjustment. There is also no particular limitation on the information registered (stored) in the necessity-of-adjustment table 54, as long as the information allows the necessity-of-adjustment determining module 51 to detect that a receiving terminal needs adjustment.

In the present embodiment, the type described in the receiving terminal information table 53 is the type of a receiving terminal represented using information included in a "User-Agent" header of RTSP. In the receiving terminal information table 53, the processing capacity of each receiving terminal is represented by either a low level which need adjustment or a high level which does not need adjustment. Information indicating addresses of respective receiving terminals which need adjustment is described in the necessity-of-adjustment table 54.

There is no particular limitation on the number of types described in the receiving terminal information table 53, and thus it is assumed, in the present embodiment, that there are N types (where N is an arbitrary integer).

In the receiving terminal information table 53, N types (type A, type B, . . . , type N) of receiving terminals are registered in the field of "Type", and the processing capacity levels (low (adjustment is needed) or high (adjustment is not needed)) corresponding to the types are described.

More specifically, for example, if the receiving terminal 13*a* is of type A and the receiving terminal 13*b* is of type B, the table generator module 56 determines that the receiving terminal 13*a* is of type A and its processing capacity is of the low level which needs adjustment and that the receiving terminal 13*b* is of type B and its processing capacity is of the low level which needs adjustment. Thus, the table generator module 56 determines that the receiving terminals 13*a* and 13*b* are receiving terminals which need adjustment and registers the address Dst.1 of the receiving terminal 13*a* and the address Dst.2 of the receiving terminal 13*b* in the necessity-of-adjustment table 54.

Furthermore, if the receiving terminal 13*c* is of type C, the table generation module 56 determines that the receiving terminal 13*c* is of type C and its processing capacity is of the high level which does not need adjustment, and thus the table generator module 56 determines that the receiving terminal 13*c* is not a receiving terminal which needs adjustment. As a result, the address Dst.3 of the receiving terminal 13*c* is not registered in the necessity-of-adjustment table 54.

Addresses of all receiving terminals which need adjustment are registered in the necessity-of-adjustment table 54, and thus the necessity-of-adjustment determining module 51 can determine whether adjustment is needed for a receiving terminal specified as the destination of a transmission unit of packets received from the packetizing module 57, on the basis of information described in the necessity-of-adjustment table 54.

Now, referring to a flow chart shown in FIG. 6, the transmission process performed by the streaming server 11 is described below.

Figure 1:
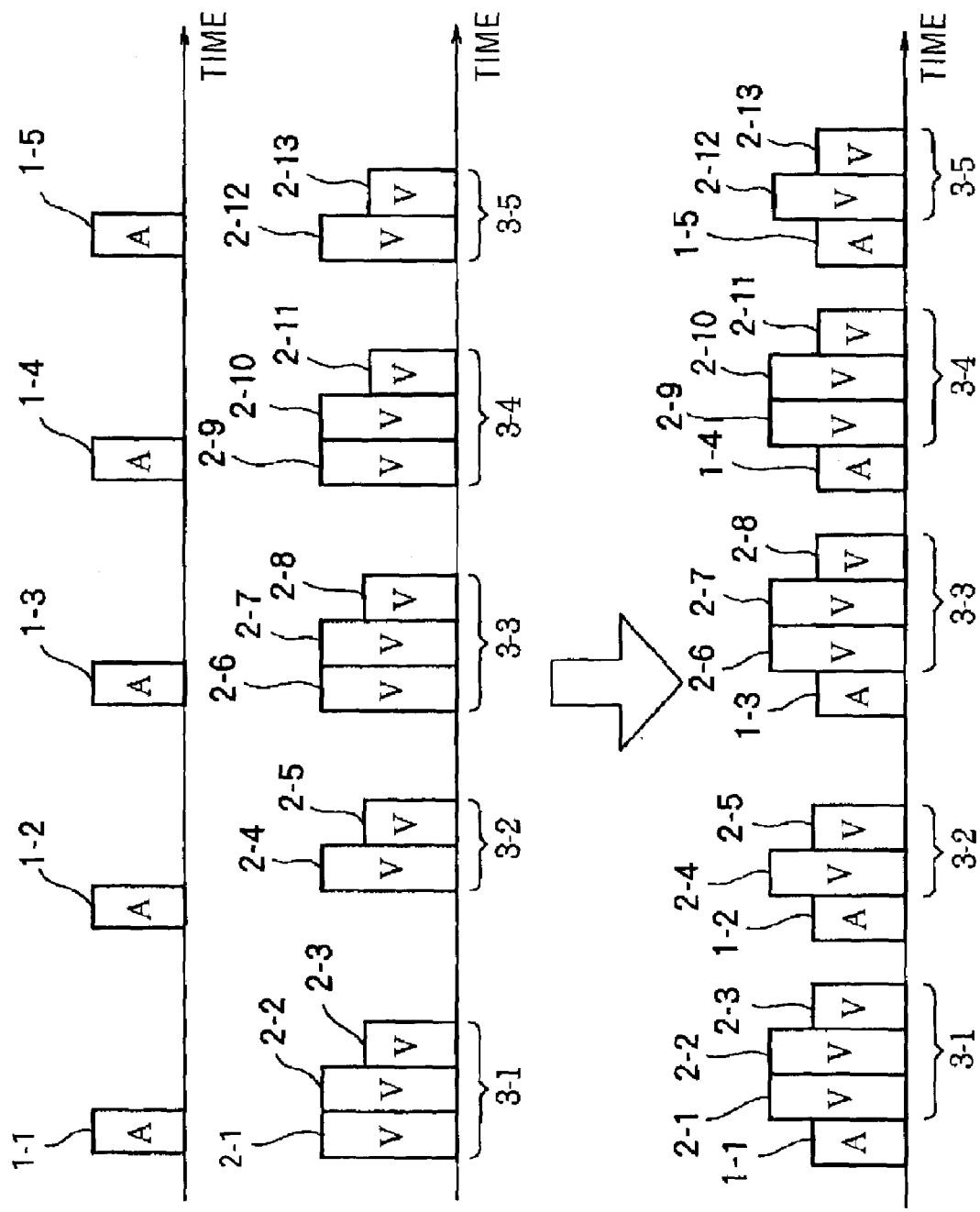
FIGS. 1A to 1C are diagrams showing examples of sets of packets transmitted by a conventional streaming server.

Herein, we assume that the receiving terminal 13*a* shown in FIG. 1 is accessing the streaming server 11 via the network 12. In step S11, the table generator module 56 shown in FIG. 4 checks the "type" field of the receiving terminal information table 53 to determine the type of the receiving terminal.

If the type of the receiving terminal 13*a* is "A", the table generator module 56 determines that the receiving terminal 13*a* is of type A on the basis of information described in the receiving terminal information table 53.

In step S12, the table generator module 56 checks the "processing capacity" field of the receiving terminal information table 53 to determine whether the processing capacity of the receiving terminal of the type determined in step S11 is of the low level which needs adjustment.

In this specific example, because the table generator module 56 has determined in step S11 that the type of the receiving terminal 13*a* is "A", the table generator module 56 determines, in step S12, that any type-A device (and thus the receiving terminal 13*a*) needs adjustment, and the table generator module 56 registers the address Dst.1 of the receiving terminal 13*a* in the necessity-of-adjustment table 54.

In the present example, in a case in which no information indicating the capacity or the type is obtained in step S11, the determination in step S12 as to whether the receiving terminal needs adjustment is performed by a manager or a manufacturer of the streaming server 11. Alternatively, the receiving terminal may request the streaming server to perform transmission at arbitrary transmission intervals.

In step S14, the table generator module 56 determines whether the above-described process has been performed for all receiving terminals.

Herein if the receiving terminal 13*b* of type B and the receiving terminal 13*c* of type C are also accessing the streaming server 11 via the network 12, the table generator module 56 determines, in step S14, that the process is not completed for all receiving terminals. In this case, the processing flow returns to step S11, and the above-described process is repeated.

That is, in the process for the receiving terminal 13*b*, the table generator module 56 detects, in step 11, that the type of the receiving terminal 13*b* is "B", and then, in step S12, detects that the processing capacity of receiving terminals of type B (and thus also the receiving terminal 13*b*) is of the low level which needs the adjustment, and furthermore, in step S13, registers the address Dst.2 of the receiving terminal 13*b* in the necessity-of-adjustment table 54.

Furthermore, in the process for the receiving terminal 13*c*, the table generator module 56 detects, in step S11, that the type of the receiving terminal 13*c* is "C", and then, in step S12, detects that the processing capacity of the receiving terminals of type C (and thus the receiving terminal 13*c*) is high enough not to need adjustment. In this case, the process proceeds to step S14 without performing step S13 (that is, without registering the address Dst.3 of the receiving terminal 13*c* in the necessity-of-adjustment table 54).

Thus, in steps S11 to S14, addresses of all receiving terminals which need adjustment are registered in the necessity-of-adjustment table 54.

In other words, in steps S11 to S14, the table generator module 56 generates a necessity-of-adjustment table 54 in which addresses of all receiving terminals which need adjustment are described.

More specifically, in this case, the table generator module 56 generates the necessity-of-adjustment table 54 in which addresses (address Dst.1 and address Dst.2) of the respective receiving terminals 13*a* and 13*b* which need adjustment are described.

If it is determined in step S14 that the process is completed for all receiving terminal, the process proceeds to step S15. In step S15, the necessity-of-adjustment determining module 51 acquires one transmission unit of packets. In the next step S16, the necessity-of-adjustment determining module 51 detects the address of the destination to which the acquired one transmission unit of packets is to be transmitted.

That is, in step S15, the necessity-of-adjustment determining module 51 acquires packets constituting one transmission unit of packets from the packetizer module 57. If all packets constituting one transmission unit of packets have been acquired, the process proceeds to step S16. In step S16, the necessity-of-adjustment determining module 51 detects the address of the destination to which the acquired one transmission unit of packets is to be transmitted.

For example, if, in step S15, the necessity-of-adjustment determining module 51 acquires a set of packets including a packet 61-1 and a packet 61-2 from the packetizer module 57 (that is, if the necessity-of-adjustment determining module 51 acquires all of packets 61-1 and 61-2), the process proceeds to step S16. In step S16, the necessity-of-adjustment determining module 51 examines the destination address described in the packets 61-1 and 61-2, thereby detecting that the destination address is Dst.1, which is the address of the receiving terminal 13a.

In step S17, the necessity-of-adjustment determining module 51 determines whether the destination address detected in step S16 is identical to any one of addresses of receiving terminals registered (in step S13) in the necessity-of-adjustment table 54, thereby determining whether the receiving terminal specified as the destination is a receiving terminal which needs adjustment.

In the present example, in step S16, the address Dst.1 of the receiving terminal 13a is detected as the destination address, and the detected address Dst.1 is found in the necessity-of-adjustment table 54 (because the address Dst. 1 was registered in step S13). Thus, in step S17, the necessity-of-adjustment determining module 51 determines that the receiving terminal 13a specified as the destination is a receiving terminal which needs adjustment. Thus, the set of packets including packets 61-1 and 61-2 (one transmission unit of packets acquired in step S15) is supplied to the transmission interval adjustment module 52.

In step S19, the transmission interval adjustment module 52 adjusts (determines) the transmission interval between packets of the one transmission unit of packets, that is, the transmission interval between the packets 61-1 and 61-2 received in step S17.

In step S20, the transmission interval adjustment module 52 sequentially supplies the packets of the one transmission unit of packets at the adjusted transmission intervals to the network via the transmission module 55.

More specifically, in the present example, the transmission interval adjustment module 52 sequentially transmits the packets 61-1 and 61-2 to the network 12 via the transmission module 55, at intervals determined in step S19.

Thus, the receiving terminal 13a first receives the packet 61-1 and then receives the packet 61-2 when a period of time equal to the transmission interval 64 has elapsed.

In step S21, the necessity-of-adjustment determining module 51 determines whether all packets have been transmitted.

For example, if packets 63-1 and 63-2 have been further supplied to the necessity-of-adjustment determining module 51, it is determined in step S21 that all sets of packets have not yet been transmitted. In this case, the processing flow returns to step S15 to repeat the above-described process.

More specifically, in the present example, the necessity-of-adjustment determining module 51 acquires, in step S15, the packets 63-1 and 63-2, and in the next step S16 the necessity-of-adjustment determining module 51 detects the address Dst.3 of the receiving terminal 13c as the destination address. In step S17, the address Dst.3 is not found in the necessity-of-adjustment table 54, and thus it is determined that the receiving terminal 13c specified as the destination is not a receiving terminal which needs adjustment. In step S18, the packets 63-1 and 63-2 are continuously (without having any interval) transmitted over the network 12 via the transmission module 55.

Thus, in this case, the reception of the packet 63-2 is started immediately after the completion of receiving the packet 63-1.

In practice, the process is not performed in such a manner that, after transmission of one transmission unit of packets is completed (in step S18 or S20), next (another) one transmission unit of packets is acquired (in step S15), but the process is performed in such a manner that the sequence of steps S15 to S20 is started each time one transmission unit of packets is supplied from the packetizer module 57 to the necessity-of-adjustment determining module 51 and the sequence of steps S15 to S20 is performed independently for the respective sets of packets.

For example, if packets 62-1 and 62-2 are supplied to the necessity-of-adjustment determining module 51 when the packets 63-1 and 63-2 are in the course of being transmitted from the transmission module 55 (in the course of being processed in step S18), the process in steps S15 to S20 is started for the packets 62-1 and 62-2 immediately when the packets 62-1 and 62-2 are supplied to the necessity-of-adjustment determining module 51.

The process in steps S15 to S20 for the set of packets including steps 62-1 and 62-2 is performed in basically the same manner, and thus further description is not provided herein.

If it is determined in step S21 that all sets of packets have been transmitted, the process is ended.

In the conventional streaming server, as shown in FIG. 7A, packets included in one transmission unit of packets (for example, a packet set consisting of packets 81-1 to 81-6 or a packet set consisting of packets 81-7 to 81-13) are continuously transmitted (without transmission intervals), and thus a receiving terminal with a low processing capacity often encounters packet congestion, which results in a packet loss (for example, packets 81-6, 81-12, and 81-13 are lost in the example shown in FIG. 7A).

In contrast, in the streaming server 11 according to the present invention, as shown in FIG. 7B, the packet-to-packet transmission intervals 82 are adjusted and packets included in each packet set (packets 81-1 to 81-6 or packets 81-7 to 81-13) are sequentially transmitted to a receiving terminal at the adjusted transmission intervals, thereby preventing packets from jamming and thus ensuring that the receiving terminal can receive packets without losing them even when the processing capacity of the receiving terminal is low.

This ensures that the receiving terminal can receive video data transmitted from the streaming server 11 in a highly reliable fashion regardless of the processing capacity of the receiving terminal. That is, the streaming server 11 can provide video data in a highly reliable fashion without loss or noise to even low-capacity receiving terminals.

There is no specific limitation on the detailed structure of the streaming server, as long as the streaming server can sequentially transmit packets of each transmission unit of packets.

Figure 8:
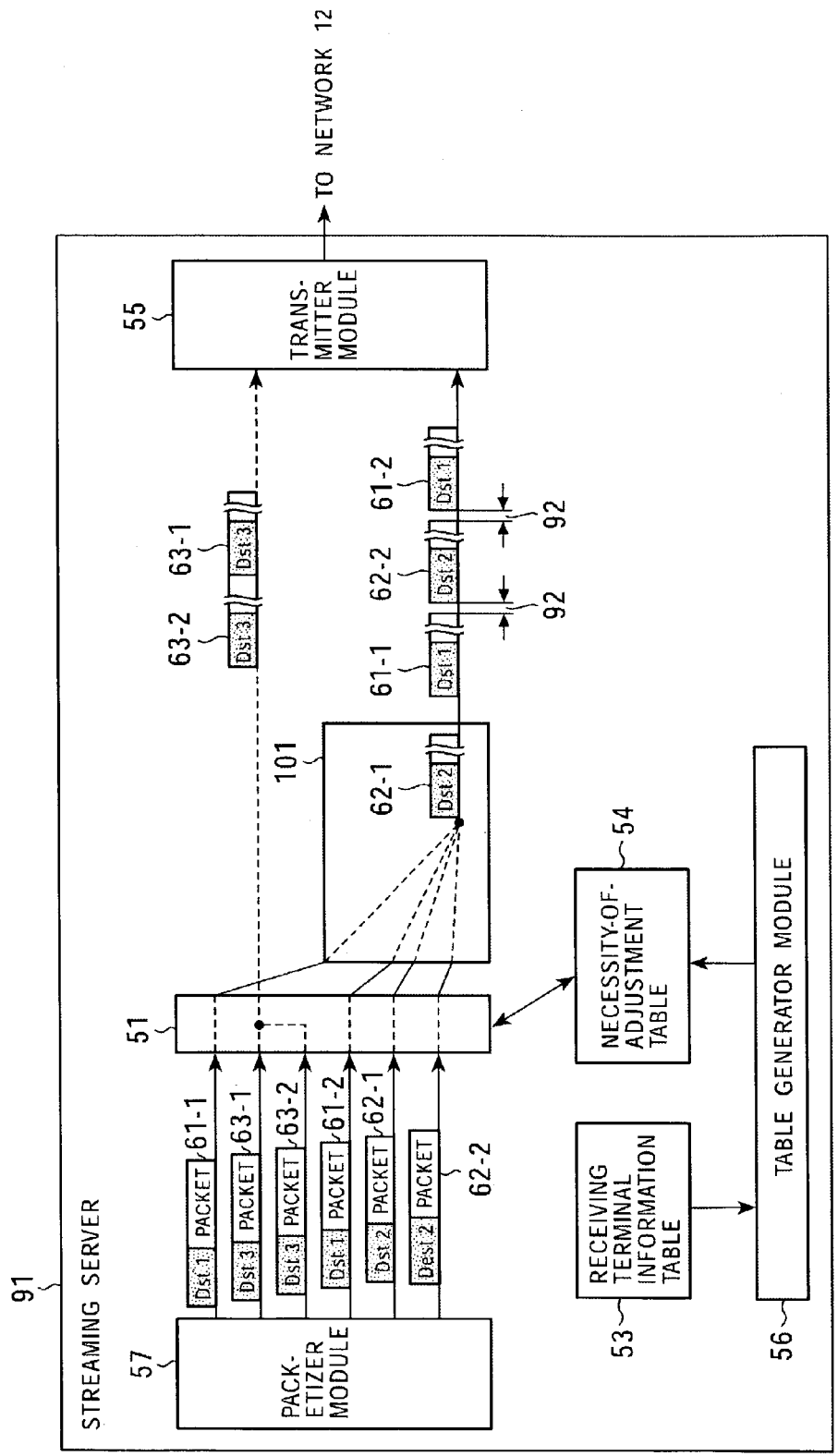
FIG. 8 is a block diagram showing another example of software configuration of the streaming server according to the present invention.

FIG. 8 shows an example of the configuration of the streaming server.

That is, FIG. 8 shows an example of software configuration of the streaming server 91 serving as the information transmission apparatus according to the present invention, wherein similar parts to those of the streaming server 11 shown in FIG. 4 are denoted by similar reference numerals.

In this example shown in FIG. 8, the transmission interval adjustment module 52 in FIG. 5 is replaced with a transmission interval adjustment module 101.

The transmission interval adjustment module 101 sorts the packets constituting one transmission unit of packets in accordance with a particular sorting scheme, and then adjusts the packet-to-packet transmission intervals for the sorted packets. The transmission interval adjustment module 101 transmits the sorted packets packet by packet over the network 12 via a transmitter module 55 at the adjusted transmission intervals.

For example, when one transmission unit of packets including video packets and audio packets is supplied to the transmission interval adjustment module 101, the transmission interval adjustment module 101 may transmit the packets of the one transmission unit of packets over the network 12 via the transmitter module 55 such that audio packets are first transmitted and then video packets are transmitted.

For example, in a case in which one transmission unit of packets (packets 61-1 and 61-2 in the example shown in FIG. 8) and another one transmission unit of packets (packets 62-1 and 62-2) are transmitted to respective different receiving terminals (the receiving terminals 13a and 13b in the example shown in FIG. 8) in a low-speed communication environment, the transmission interval adjustment module 101 arranges the locations of respective packets into a proper order (in the order of packet 61-2, packet 62-2, packet 61-1, and 62-1 in the example shown in FIG. 8), and the transmission interval adjustment module 101 sequentially transmits the packets in the arranged order over the network 12 via the transmitter module 55 at the transmission intervals 92.

This allows each receiving terminal to receive a similar number of packets each unit of time.

Figure 6:
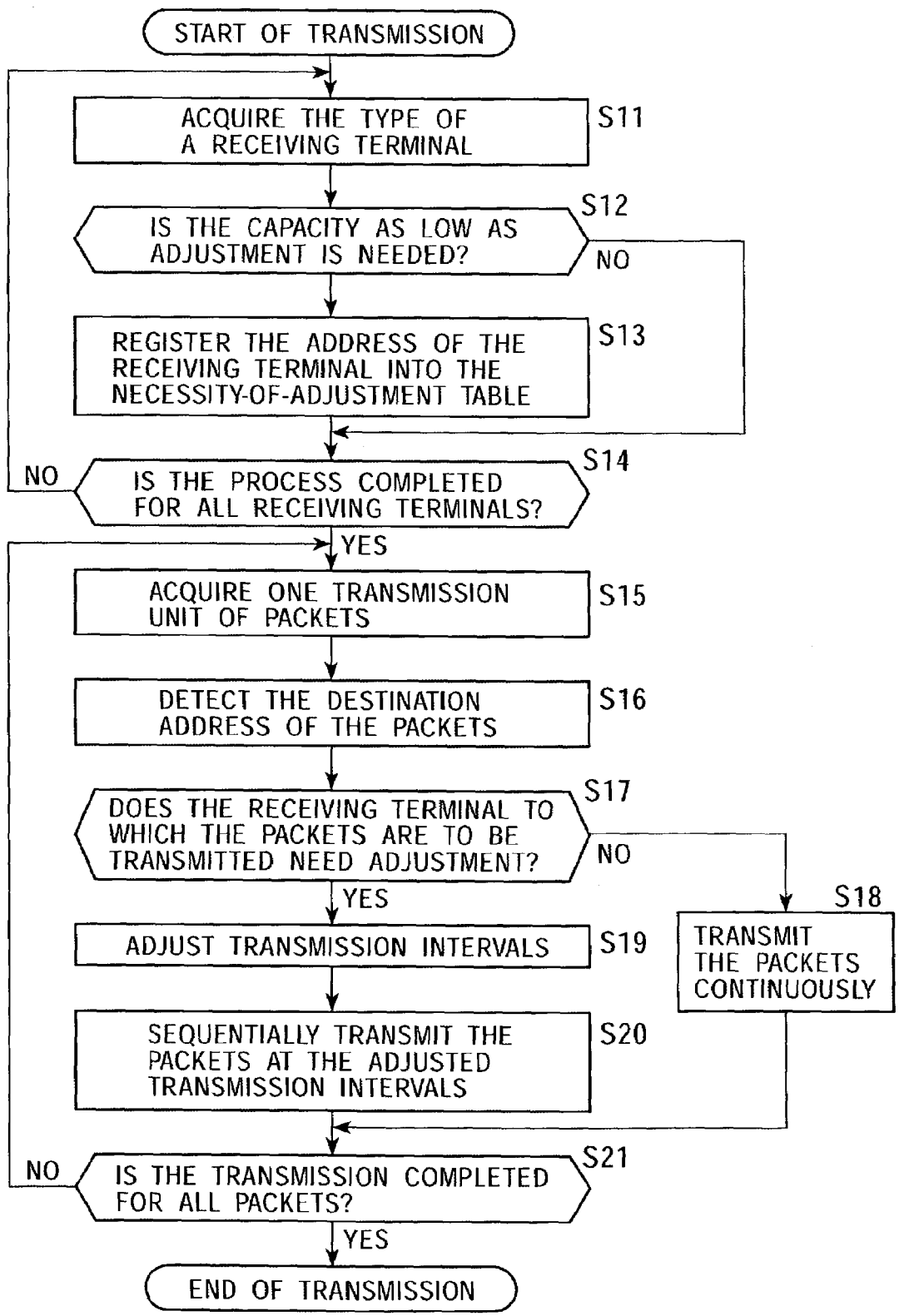
FIG. 6 is a flow chart showing a transmission process performed by the streaming server shown in FIG. 4.

The other parts are similar to those of the software configuration shown in FIG. 4, and the hardware configuration is similar to that shown in FIG. 6, and thus further detailed description is not provided herein.

A software program needed to realize the functions of respective modules may be installed from a storage medium or via a network.

For example, the program may be stored on a packaged medium such as a magnetic disk 41 (floppy disk or the like), an optical disk 42 (CD-ROM (Compact Disk-Read Only Memory), DVD (Digital Versatile Disk, or the like)), an magnetooptical disk 43 (MD (Mini-Disk) or the like), or a semiconductor memory 44, and the packaged medium may be supplied to users, separately from the main part of the apparatus, to provide the program to users. The program may also be stored in a ROM 22 or a hard disk of a storage unit 28 installed in the apparatus and may be provided to users together with the main part of the apparatus.

In the present invention, the steps described in the program stored on the storage medium may be performed time-sequentially in the same order as that in which the steps are described in the program or may be performed not time-sequentially but in parallel or individually.

There is no particular limitation on the form of the modules, as long as the functions of the respective modules can be achieved. That is, each module may also be implemented by means of hardware. For example, the necessity-of-adjustment determining module 51, the transmission interval adjustment module 52, and the table generation module 56 may be produced by means of hardware, and they may be connected in such a manner as shown in FIG. 4.

Although in the embodiment described above, the modules are disposed in the streaming server, some modules such as the necessity-of-adjustment determining module 51, the transmission interval adjustment module 52, and the table generator module 56 may be disposed in another information processing apparatus connected to the network 12 shown in FIG. 12.

Note that in the description, the term "system" is used to describe a whole collection of a plurality of means and/or apparatuses connected to each other.

What is claimed is:

1. An information transmission method for an information transmission apparatus including a processing unit to transmit information in units of a particular set of packets to a plurality of receiving terminals, said method comprising:

a necessity-of-adjustment determining step of determining with the processing unit whether the receiving terminal specified as the destination of the set of packets is a receiving terminal which needs the adjustment of inter-packet transmission intervals, on the basis of information described in a receiving terminal information table including information indicating the type and the processing capacity of the receiving terminal the inter-packet transmission intervals start at the completion of transmission of a packet and end at the beginning of transmission of a subsequent packet;

a transmission interval adjusting step, of adjusting some packet-to-packet inter-packet transmission intervals using an interval adjusting device, at which some of the sets of packets are to be transmitted, and not adjusting other packet-to-packet inter-packet transmission intervals at which other sets of packets are to be transmitted continuously, depending on the processing capacity of the receiving terminal indicated by the information stored in the table; and a transmission step, of transmitting the set of packets, packet by packet, to the receiving terminals (i) at the inter-packet transmission intervals adjusted in the transmission interval adjusting step or continuously, wherein, when it is determined, in the necessity-of-adjustment determining step, that the receiving terminal specified as the destination of the set of packets is a receiving terminal which needs the adjustment of inter-packet transmission intervals, execution of the transmission interval adjusting step is accomplished using the interval adjusting device and when it is determined, in the necessity-of-adjustment determining step, that the receiving terminal specified as the destination of the set of packets is a receiving terminal which does not need the adjustment of inter-packet transmission intervals, the interval adjusting device is bypassed.

2. An information transmission method according to claim 1, wherein the type described in the receiving terminal information table is a model name.

3. An information transmission method according to claim 2, further comprising a table generation step, of generating a necessity-of-adjustment table including information identifying each receiving terminal, included in a plurality of receiving terminals, which needs the adjustment of inter-packet transmission intervals, wherein the necessity-of-adjustment determining step determines whether the receiving terminal specified as the destination of the set of packets is a receiving terminal which needs the adjustment of inter-packet transmission intervals, on the basis of necessity-of-adjustment table generated in the table generation step.

4. An information transmission method according to claim 3, the necessity-of-adjustment determining step includes the steps of acquiring all packets constituting the set of packets; detecting the destination to which the packets should be transmitted; and determining whether a receiving terminal specified as the destination is a receiving terminal which needs the adjustment of inter-packet transmission intervals.

5. An information transmission method according to claim 4, wherein the information transmission apparatus and receiving terminals are connected to each other via network, the destination is specified by an address on the network, and the information, described in the necessity-of-adjustment table to identify each receiving terminal which needs adjustment of inter-packet transmission intervals, is an address of the receiving terminal which needs adjustment of inter-packet transmission intervals.

6. An information transmission method according to claim 1, wherein the transmission interval adjusting step uses an FIFO technique.

7. An information transmission method according to claim 1, wherein
the transmission interval adjusting step includes the steps of sorting the packets constituting the set of packets in accordance with a particular sorting scheme; and adjusting the inter-packet transmission intervals for the sorted packets; and
the transmission step transmits the packets sorted in the transmission interval adjusting step, packet by packet, at the inter-packet transmission intervals adjusted in the transmission interval adjusting step.

8. An information transmission method according to claim 1, wherein said information transmitted to the receiving terminal is information in access units, and said set of packets includes packets constituting an access unit of video data.

9. An information transmission method according to claim 8, wherein said set of packets further includes packets constituting an access unit of audio data.

10. A storage medium including a computer-readable program stored therein for causing a computer including a processing unit to control an information transmission apparatus for transmitting information in units of a particular set of packets to a plurality of receiving terminals, the control process comprising:
a necessity-of-adjustment determining step, of determining with the processing unit whether a receiving terminal specified as the destination of the set of packets is a receiving terminal which needs adjustment of inter-packet transmission intervals, on the basis of information described in a receiving terminal information table including information indicating the type and the processing capacity of the receiving terminal the inter-packet transmission intervals start at the completion of transmission of a packet and end at the beginning of transmission of a subsequent packet;
a transmission interval adjusting step, of adjusting some packet-to-packet inter-packet transmission intervals using an interval adjusting device, at which some of the sets of packets are to be transmitted, and not adjusting other packet-to-packet inter-packet transmission intervals at which other sets of packets are to be transmitted continuously, depending on the processing capacity of the respective receiving terminals indicated by the information stored in the table; and
a transmission step, of transmitting the set of packets, packet by packet, to the receiving terminals (i) at the inter-packet transmission intervals adjusted in the transmission interval adjusting step or (ii) continuously,
wherein,
when it is determined, in the necessity-of-adjustment determining step, that the receiving terminal specified as the destination of the set of packets is a receiving terminal which needs the adjustment of inter-packet transmission intervals, execution of the transmission interval adjusting step is accomplished using the interval adjusting device and
when it is determined that the receiving terminal specified as the destination of the set of packets is a receiving terminal which does not need the adjustment of inter-packet transmission intervals, the interval adjusting device is bypassed.

11. An information transmission apparatus for transmitting information in units of a set of packets to a plurality of receiving terminals, comprising:
a storage device configured to store information indicating the type and processing capacity of each of the plurality of receiving terminals;
means for determining whether packet-to-packet inter-packet transmission intervals should be adjusted depending on the processing capacity of the receiving terminal indicated by the stored information the inter-packet transmission intervals start at the completion of transmission of a packet and end at the beginning of transmission of a subsequent packet;
an interval adjusting device configured to adjust the packet to packet inter-packet transmission interval when the means for determining determines that an adjustment is necessary; and
transmission means for transmitting the set of packets, packet by packet, to the receiving terminals (i) at the inter-packet transmission intervals adjusted by the-interval adjusting means or (ii) continuously,
wherein,
when it is determined that the receiving terminal specified as the destination of the set of packets is a receiving terminal which does not need the adjustment of inter-packet transmission intervals, the interval adjusting device is bypassed.

12. An information transmission method for an information transmission apparatus including a processing unit to transmit information in units of a set of packets to a plurality of receiving terminals, said method comprising:
a storing information step, of storing information indicating the type and processing capacity of each of the plurality of receiving terminals;
a transmission interval adjusting step, of adjusting some packet-to-packet inter-packet transmission intervals using an interval adjusting device, at which some of the sets of packets are to be transmitted, and not adjusting other packet-to-packet inter-packet transmission intervals at which other sets of packets are to be transmitted continuously, depending on the processing capacity of the receiving terminal indicated by the stored information the inter-packet transmission intervals start at the completion of transmission of a packet and end at the beginning of transmission of a subsequent packet; and
a transmission step, of transmitting the set of packets, packet by packet, to the receiving terminals (i) at the inter-packet transmission intervals adjusted in the transmission interval adjusting step or (ii) continuously,
wherein,
when it is determined by the processing unit, in the necessity-of-adjustment determining step, that the receiving terminal specified as the destination of the set of packets is a receiving terminal which needs the adjustment of inter-packet transmission intervals, execution of the transmission interval adjusting step is accomplished using the interval adjusting device and
when it is determined that the receiving terminal specified as the destination of the set of packets is a receiving terminal which does not need the adjustment of inter-packet transmission intervals, the interval adjusting device is bypassed.

* * * * *